US008342371B2

(12) United States Patent
Helmenstein

(10) Patent No.: US 8,342,371 B2
(45) Date of Patent: Jan. 1, 2013

(54) CAULKING GUN WITH A RADIALLY EXPANDING PRESSURE DISK

(75) Inventor: Achim Helmenstein, Engelskirchen (DE)

(73) Assignee: Fischbach KG Kunststoff Technik, Engelskirchen (DE)

( * ) Notice: Subject to any disclaimer, the term of this patent is extended or adjusted under 35 U.S.C. 154(b) by 438 days.

(21) Appl. No.: 12/638,757

(22) Filed: Dec. 15, 2009

(65) Prior Publication Data

US 2010/0147895 A1 Jun. 17, 2010

(30) Foreign Application Priority Data

Dec. 17, 2008 (DE) ........................ 10 2008 063 502

(51) Int. Cl.

| | |
|---|---|
| ***B65D 88/54*** | (2006.01) |
| ***G01F 11/00*** | (2006.01) |
| ***B67D 7/60*** | (2010.01) |
| ***F16J 1/06*** | (2006.01) |

(52) U.S. Cl. .......................... 222/327; 222/386; 92/207

(58) Field of Classification Search .................. 222/326, 222/327, 386, 390, 391, 1; 92/192–194, 92/201–207

See application file for complete search history.

(56) References Cited

U.S. PATENT DOCUMENTS

| | | | | |
|---|---|---|---|---|
| 103,140 | A * | 5/1870 | Clark | 92/207 |
| 1,427,647 | A * | 8/1922 | Sharp | 92/193 |
| 2,393,747 | A * | 1/1946 | Buchanan | 92/206 |
| 2,887,253 | A * | 5/1959 | Biedenstein | 222/327 |
| 2,958,445 | A * | 11/1960 | Jesse | 222/386 |
| 3,352,213 | A * | 11/1967 | Karol | 92/204 |
| 3,501,063 | A * | 3/1970 | Sundholm | 222/326 |
| 3,745,890 | A * | 7/1973 | Costarella | 92/192 |
| 4,834,268 | A * | 5/1989 | Keller | 222/327 |
| 4,840,293 | A * | 6/1989 | Segatz | 222/94 |
| 5,407,332 | A * | 4/1995 | Yedinak et al. | 417/489 |
| 5,836,235 | A * | 11/1998 | Rudiger et al. | 92/178 |
| 6,334,548 | B1 * | 1/2002 | Ichikawa et al. | 222/107 |
| 7,491,191 | B2 * | 2/2009 | Wagner et al. | 604/228 |

FOREIGN PATENT DOCUMENTS

| | | |
|---|---|---|
| DE | 7923330 | 8/1979 |
| DE | 4042065 | 7/1992 |
| DE | 10342090 | 6/2007 |
| DE | 4345573 | 8/2007 |
| DE | 202008007834 | 8/2008 |
| EP | 0 867 403 A1 | 9/1998 |
| EP | 1 908 703 A1 | 4/2008 |
| JP | 2003-334483 | 11/2003 |

OTHER PUBLICATIONS

European Search Report for corresponding European Patent Application No. 09179251.5 dated Apr. 28, 2010.

Search Report for corresponding German patent application No. 102008063502.2 dated Jan. 1, 2006.

* cited by examiner

*Primary Examiner* — Kevin P Shaver
*Assistant Examiner* — Matthew Lembo
(74) *Attorney, Agent, or Firm* — Renner, Otto, Boisselle & Sklar, LLP

(57) ABSTRACT

The caulking gun comprises a cartridge holder (12) for accommodating a cartridge (25). For pressing out the substance contained in the cartridge (25), use is made of a piston (30) which is advanced by a pressure disk (16). The pressure disk (16) can be radially expanded under the influence of the advancement force and thus will press by a spreading edge (49) against the side wall (31) of the piston (30). In this manner, the piston in the region of its side wall (31) is tightly pressed against the cartridge wall. Leakage of substance past the piston (30) is prevented.

9 Claims, 7 Drawing Sheets

CAULKING GUN WITH A RADIALLY EXPANDING PRESSURE DISK

This application claims priority of German Patent Application No. 10 2008 063 502.2 filed on Dec. 17, 2008 which is hereby incorporated herein by reference in

BACKGROUND OF THE INVENTION

1. Field of the Invention

The present invention relates to a caulking gun comprising a packing holder which has a longitudinal axis and is configured to accommodate a substantially cylindrical packing, said packing including an axially displaceable packing bottom, and said caulking gun further comprising a pressure disk.

2. Description of the Prior Art

Plastic substances, such as e.g. sealing compositions or adhesives, are made available for marketing by filling them into cartridges having an elongated cylindrical cartridge body. The cartridge body has a closed front end and an open rear end. Arranged at the front end is an end wall provided with a tubular projection or nozzle extending therefrom for pressing out the composition therethrough. The process of pressing out the substance from the cartridge is normally performed with the aid of a caulking gun. This tool includes a cartridge holder and an advancement mechanism for propelling an advancement rod carrying a pressure disk. The pressure disk will be inserted into the piston arranged in the cartridge. By actuating the caulking gun, the pressure disk will be intermittently or continuously advanced, thus extruding a quantity of substance from the cartridge via said tubular projection.

When substance is to be extruded out from a cartridge by advancement of a piston, it is important that the piston is sealed with the cylindrical cartridge wall. If the sealing function of the piston should be imperfect, a part of the substance may under the effect of the extrusion pressure be caused to flow past the piston and reach the pressure disk behind the piston. The substance leaking out in this manner will contaminate the caulking gun. Since the substance will harden or have an adhesive effect, it may even render the caulking gun unfit for use. At any rate, said leakage of substance often makes it necessary to perform an extensive cleaning process.

It is known that a piston arranged to be moved within a cartridge and made of semi-rigid plastic can be provided, in its interior, with an annular support lip engaging the transition region between the piston front face and the surrounding wall and having a shape tapering frustoconically towards the interior of the piston. When a press-on plate presses against the support lip, the piston is caused to be widened towards the outside in the edge region of the piston front face; thus, the piston will at least on its front piston shoulder be tightly pressed against a side wall of the cartridge. However, the side wall of the piston does not participate in said widening movement along its full length. If a quantity of the substance should happen to pass the piston shoulder, this quantity cannot be prevented anymore to pass also the complete piston and to get into contact with the caulking gun. Further, this arrangement will not allow the piston diameter to be widened by more than just a few tenths of a millimeter.

It is an object of the invention to provide an improved caulking gun wherein a rearward leakage of substance past the bottom of the packing and respectively past the piston is prevented.

SUMMARY OF THE INVENTION

The caulking gun according to the present invention is characterized in that said pressure disk is configured to become radially widened as a result of an advancement force acting in the direction of the longitudinal piston.

According to the invention, the pressure disk of the caulking gun, when subjected to an axially directed advancement force, will undergo a radial widening deformation which is effective to seal the annular gap between the bottom of the packing and the side wall of the packing.

The invention is applicable to a caulking gun designed for insertion into a rigid cartridge accommodating an advanceable piston therein. However, the invention is also applicable to a caulking gun provided to press out a packing having a flexible packing shell and containing a flowable plastic substance. The flexible plastic shell can comprise a rigid or flexible packing bottom. During the press-out process, said packing bottom is axially displaced in the direction of the outlet opening of the packing. When the caulking gun is applied to a cartridge, it is prevented that plastic substance leaks out in the rearward direction past the packing bottom. When applied to a flexible packing shell, the caulking gun will safeguard that the shell will be collapsed in a controlled manner during the press-out process. Thus, it is prevented that a fold of the shell can undesirably take a position between the packing bottom and the packing holder or between the pressure disk and the packing holder. Such an occurrence would lead to jamming. In a caulking gun for cartridges, the widening deformation achieved by the invention in the side wall region and particularly near the rear end of the piston, will result in an improved sealing against leakage of substance. Particularly in case of high advancement forces, the piston will exert its spreading function with increased strength. As a consequence, leakage of substance past the piston can be virtually fully prevented.

A further aspect of the invention resides in that the pressure disk does not need to be closely adapted to the dimensions of the packing. Thus, standard cartridges are allowed to have different sizes which deviate from each other in the millimeter range. Such cartridges are provided with different pistons of various diameters and thus can be pressed out by the selfsame caulking gun without contamination.

The term "caulking gun" is not restricted to mean a gun-shaped tool. The tool need not have a gun grip or finger hook. The caulking gun of the invention even makes it possible to fixedly mount the packing holder to the advancement device. In the state of the art, the cartridge holder had been mounted to the advancement device in a releasable manner so as to be removable for cleaning purposes. Since the caulking gun of the invention is of a design that prevents contamination, the need for the cartridge holder or gun-type tube to be removable or easily accessible is consequently obviated.

According to a further embodiment of the invention, the pressure disk comprises a rigid support member and a deformable spreading member supported on said support member. The pressure disk is of a two-part design. The spreading member is widened by the rigid support member and thereby in turn is caused to press against the side wall of the piston. The support member also forms the actuating element for spreading the spreading member. The advancement movement of the support member in the direction of the spreading member is performed by the extrusion pressure used to advance the piston.

The spreading member can also consist of a circumferentially expandable spreading ring arranged between the support member and a pressing element. Said spreading ring is a separate component and is preferably composed of segments interconnected by elastic elements. The spreading ring can be of an open or a closed configuration.

The spreading member can have a spreading edge which is arranged to engage the rear end of the side wall of the piston. Thereby, it is achieved that the widenable rear end of the piston will exert an increased sealing and strip-off effect and thus cannot be passed by the substance.

The support member can comprise an annular cam surface which is effective to cause the widening of the spreading member under the influence of an advancement force. Particularly, the spreading member can comprise a hub provided with a plurality of elastic arms separated from each other by slits.

By way of alternative to a mechanical widening structure, also a fluid-operated widening structure can be provided on the pressure disk. For this purpose, the pressure disk can comprise a flexible peripheral wall enclosing a fluid chamber delimited by two end walls. The pressure disk is formed by said two end walls together with the fluid chamber. Upon occurrence of a partial advancement force, the peripheral wall of the fluid chamber, which wall is formed a membrane, will be radially pressed against the side wall of the piston. Thereby, an areally distributed widening force is generated.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which.

DETAILED DESCRIPTION OF PREFERRED EMBODIMENTS

Figure 1:
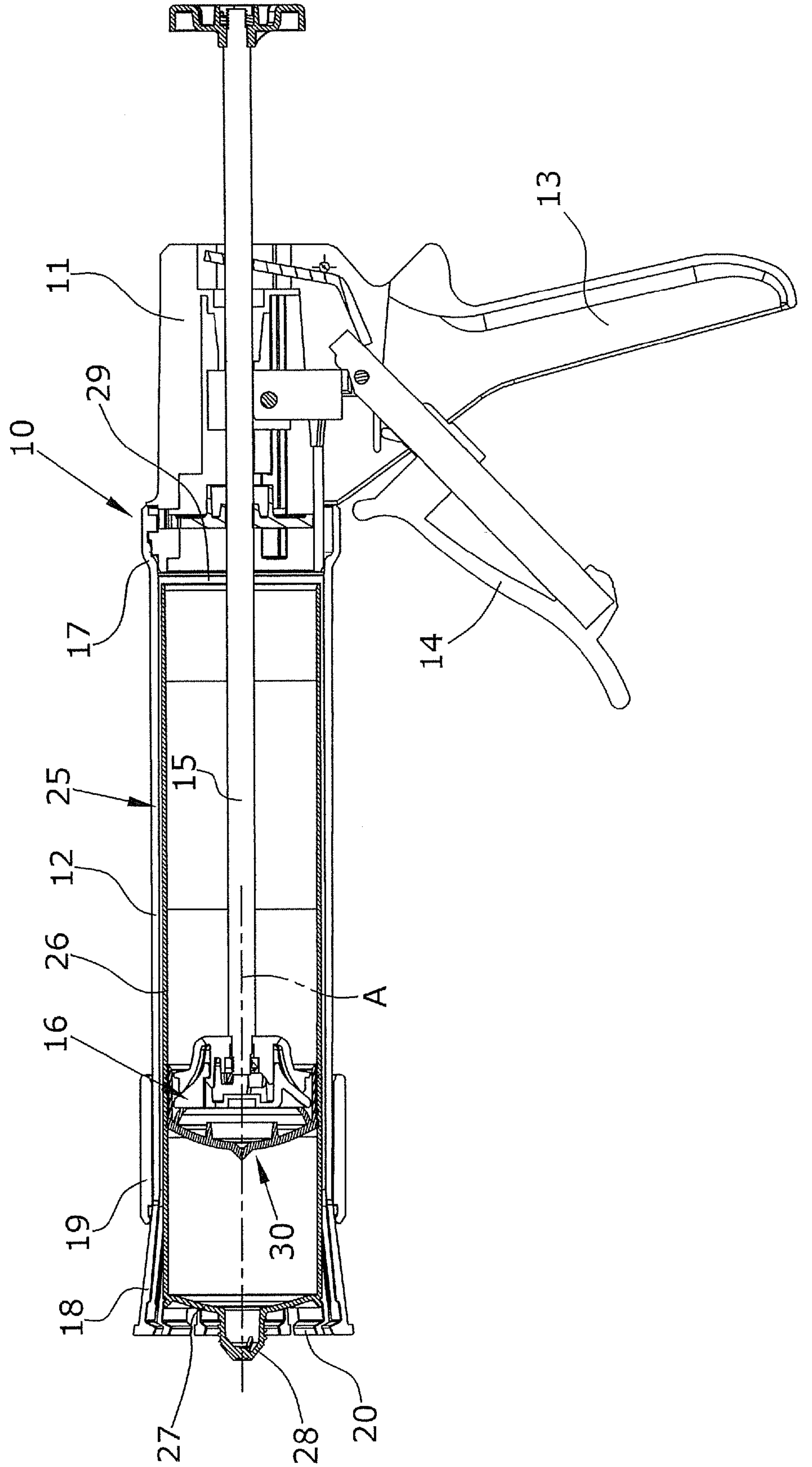
FIG. 1 is a schematic longitudinal sectional view of a caulking gun after insertion thereinto of a cartridge with piston.
Figure 2:
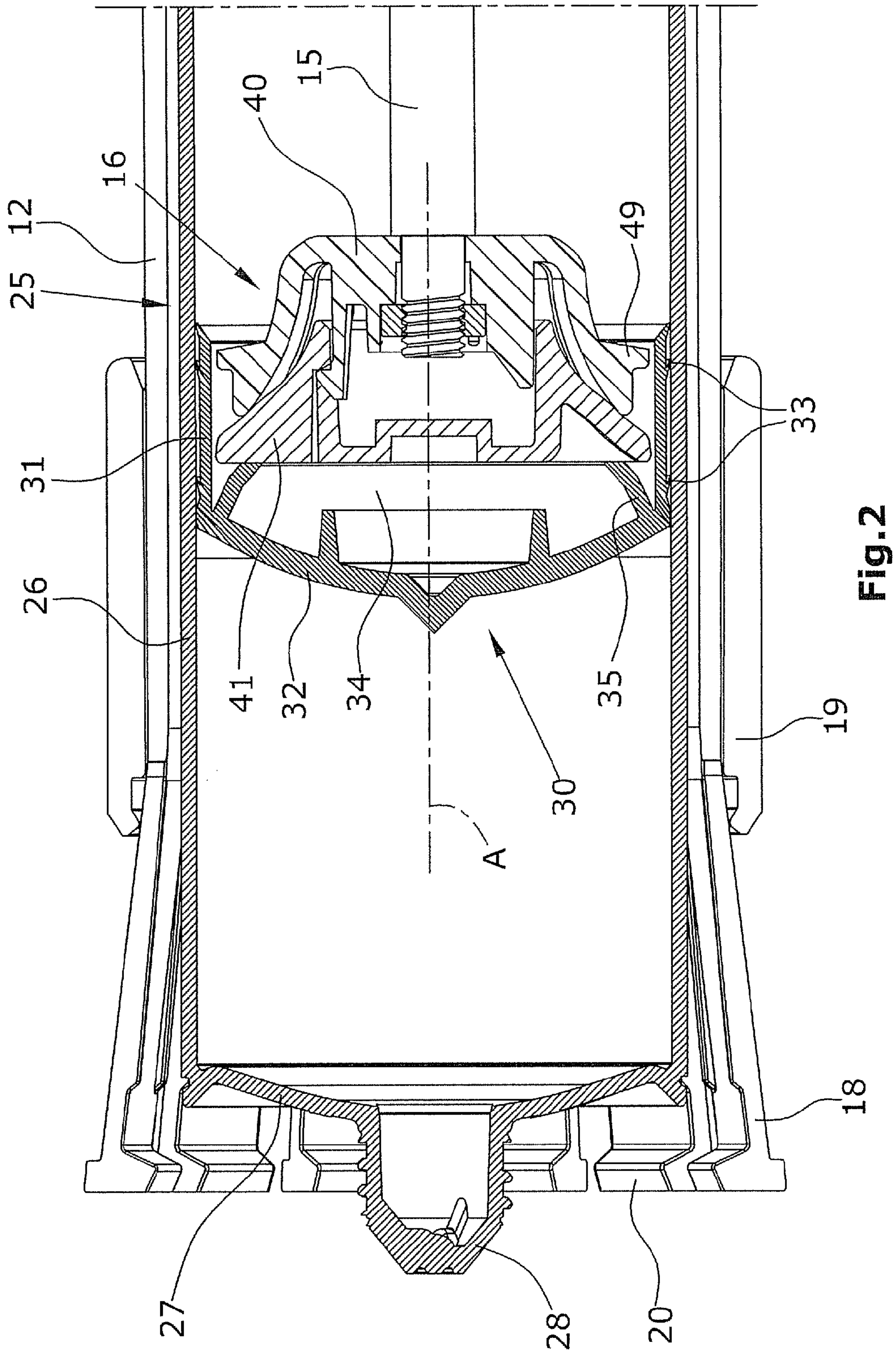
FIG. 2 is an enlarged view of the front end of the caulking gun with cartridge and piston.

Illustrated in FIGS. 1 and 2 is a caulking gun 10 comprising an advancement device 11 and a packing holder 12. Said advancement device 11 is a gun-type unit comprising a handle 13 and a trigger 14. By actuating the trigger, an advancement rod 15 will be moved forward in a stepwise manner. Arranged on the front end of advancement rod 15 is a pressure disk 16. Each time that the trigger 14 is actuated, advancement rod 15 will be advanced by a respective distance in the fashion of a ratchet. After termination of the press-out process, advancement rod 15 can be retracted by actuating a release lever.

Said packing holder 12 is a cartridge accommodation tube which is releasably fastened to advancement device 11 with the aid of a quick-lock arrangement 17. The cartridge holder 12 is on its forward end provided with spreading arms 18 tending to resiliently move apart from each other so as to allow for insertion of a cartridge from the front. Subsequently, a ring 19 will be slid forward on cartridge holder 12 whereby said spreading arms 18 will be pressed radially inward and will axially fix the cartridge in the caulking gun with the aid of corresponding holding noses 20. Packing holder 12 has a longitudinal axis A which in the present exemplary embodiment coincides with the axis of the cartridge accommodation tube.

Insertion of the cartridge 25 into cartridge holder 12 is performed via the front end of the holder. Cartridge 25 comprises an elongated cylindrical cartridge body 26, with its front end closed by an end wall 27. Axially extending from said end wall 27 is a tubular projection 28 having a detachable nipple. The rear end 29 of cartridge body 26 is open. From this end, piston 30 will be inserted after the substance has been filled in.

Piston 30 is sized to completely occupy the cross section of the cartridge. Piston 30 has a substantially cylindrical side wall 31 and a relatively thick-walled piston front face 32 on its forward end. Side wall 31 is provided with sealing lips 33 extending therefrom. Pressure disk 16 will be inserted into a hollow space 34 of the piston. In the process, it will abut against a spreading lip 35 extending inwards from the shoulder region of piston front face 32 and having a frustoconical shape. Under the effect of the advancement force of pressure disk 16, the spreading lip 35 will spread the shoulder region of the piston, i.e. the edge region of the piston front face 32, towards the outside by some tenths of a millimeter.

Figure 3:
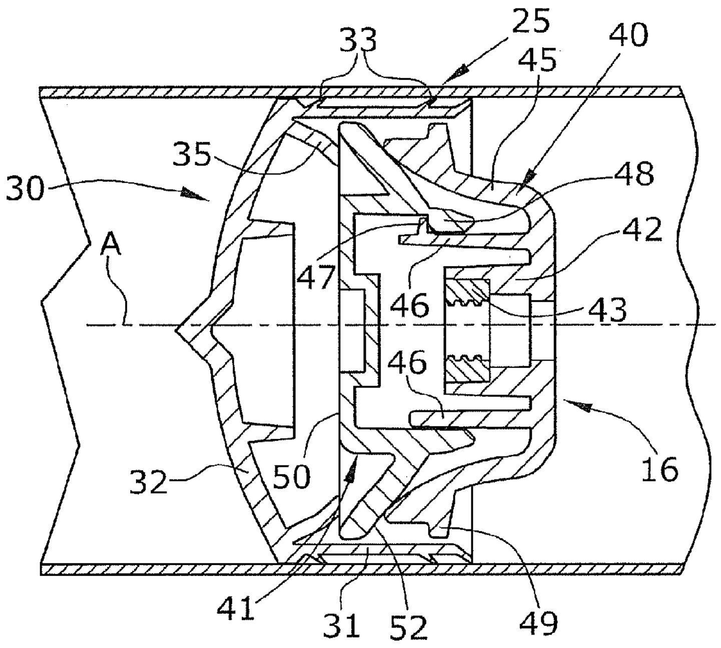
FIG. 3 is a longitudinal sectional view of the piston arranged in the cartridge prior to application of the extrusion pressure.
Figure 4:
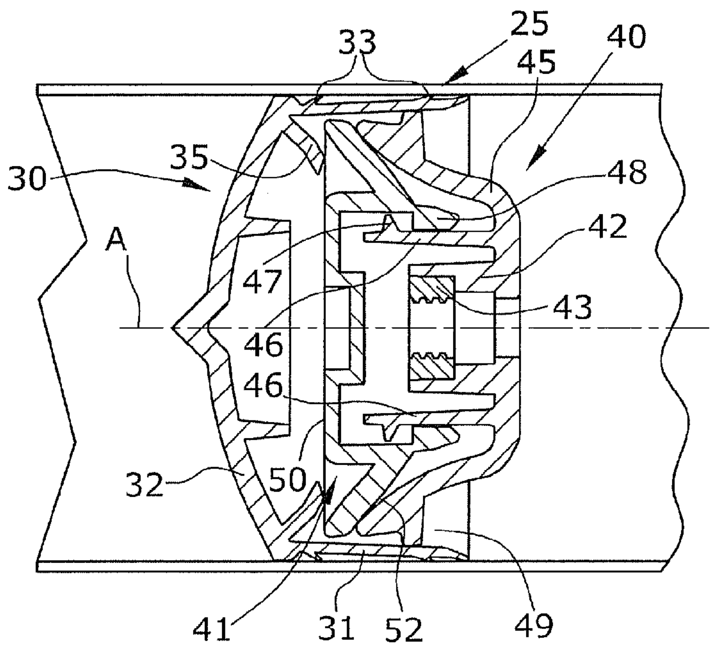
FIG. 4 is a longitudinal sectional view similar to FIG. 3 during application of the extrusion pressure.

In the above described first embodiment, pressure disk 16 has a two-part design. Pressure disk 16 comprises a spreading member 40 mounted to advancement rod 15, and a support member 41 arranged upstream of spreading member 40 (FIGS. 3 and 4). Said spreading member 40 is formed with a hub 42 including a nut 43 for attachment of the end of advancement rod 15. From hub 42, arms 45, separated from each other by slits, extend obliquely forwards in a radial configuration. Spreading member 40 further comprises axially extending hooks 46 forming locking elements 47 for locking engagement with corresponding locking elements 48 of support member 41. By this arrangement, the support member and the spreading member are held in place relative to each other.

Each of the arms 45 extending from hub 42 of spreading member 40 is resilient individually by itself. The arms 45 in combination form a spreading edge 49 adapted to press from inside against the side wall 31 of piston 30. Said spreading edge 49 is positioned to act on the rear end region of side all 31.

The spreading of the arms 45 is effected by support member 41 which is relatively rigid. Support member 41 comprises a plane front side 50 bearing against the spreading lip 35 of piston 30. On the rear side, the support member has a frustoconical sliding face 52 against which the ends of the arms 45 are pressed. When the spreading member 40 becomes axially pressed against support member 41, said sliding face 52 is operative to press the ends of the arms 45 of spreading member 40 toward the outside. Thereby, the side wall 31 of piston 30 is tightly pressed against the cartridge wall. The larger the advancement force is, the higher the press-on effect will be.

Figure 5:
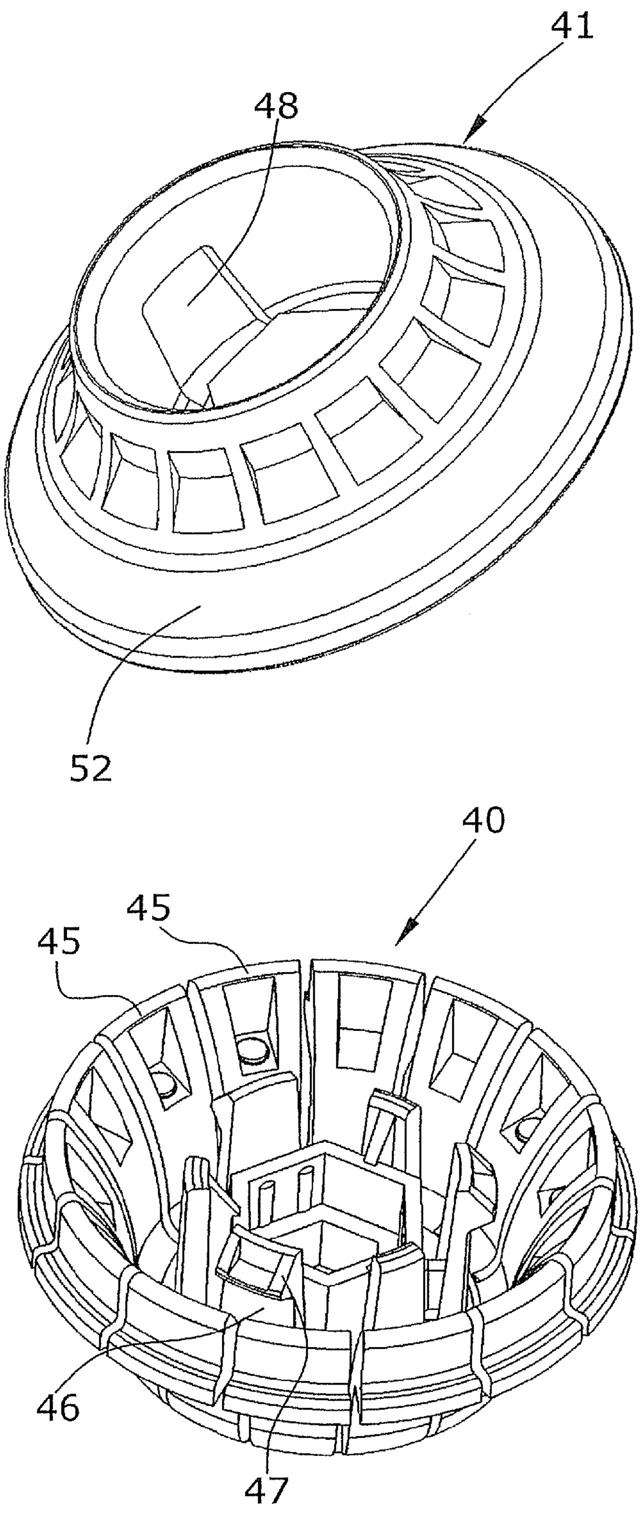
FIG. 5 is a view of the support member and the spreading member in the folded-apart state.

FIG. 5 illustrates the spreading member 40 and the support member 41 in the disassembled state. Support member 41 is relatively rigid while the arms 45 of spreading member 40 are individually resilient and thus have a higher elasticity.

Figure 6:
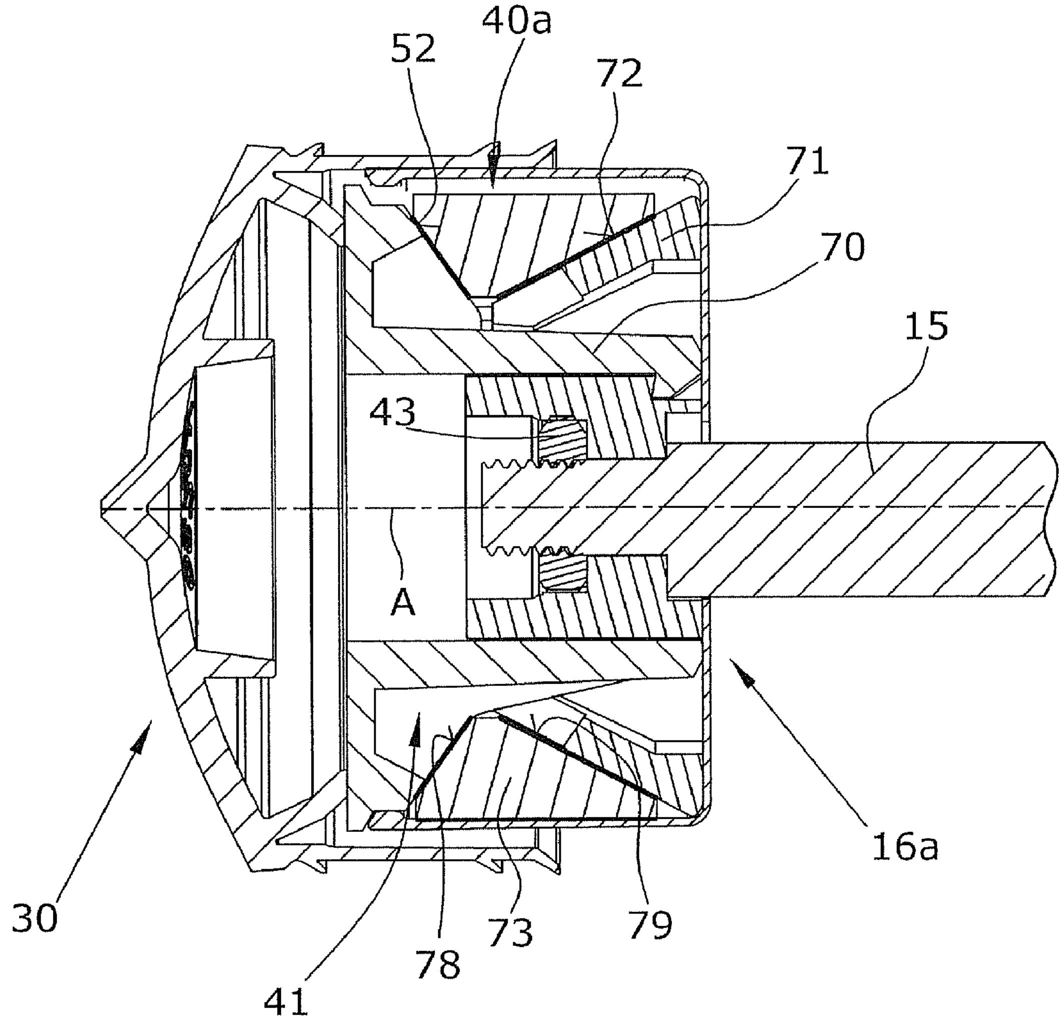
FIG. 6 is a longitudinal sectional view of a further embodiment of the pressure disk with mounted piston.
Figure 7:
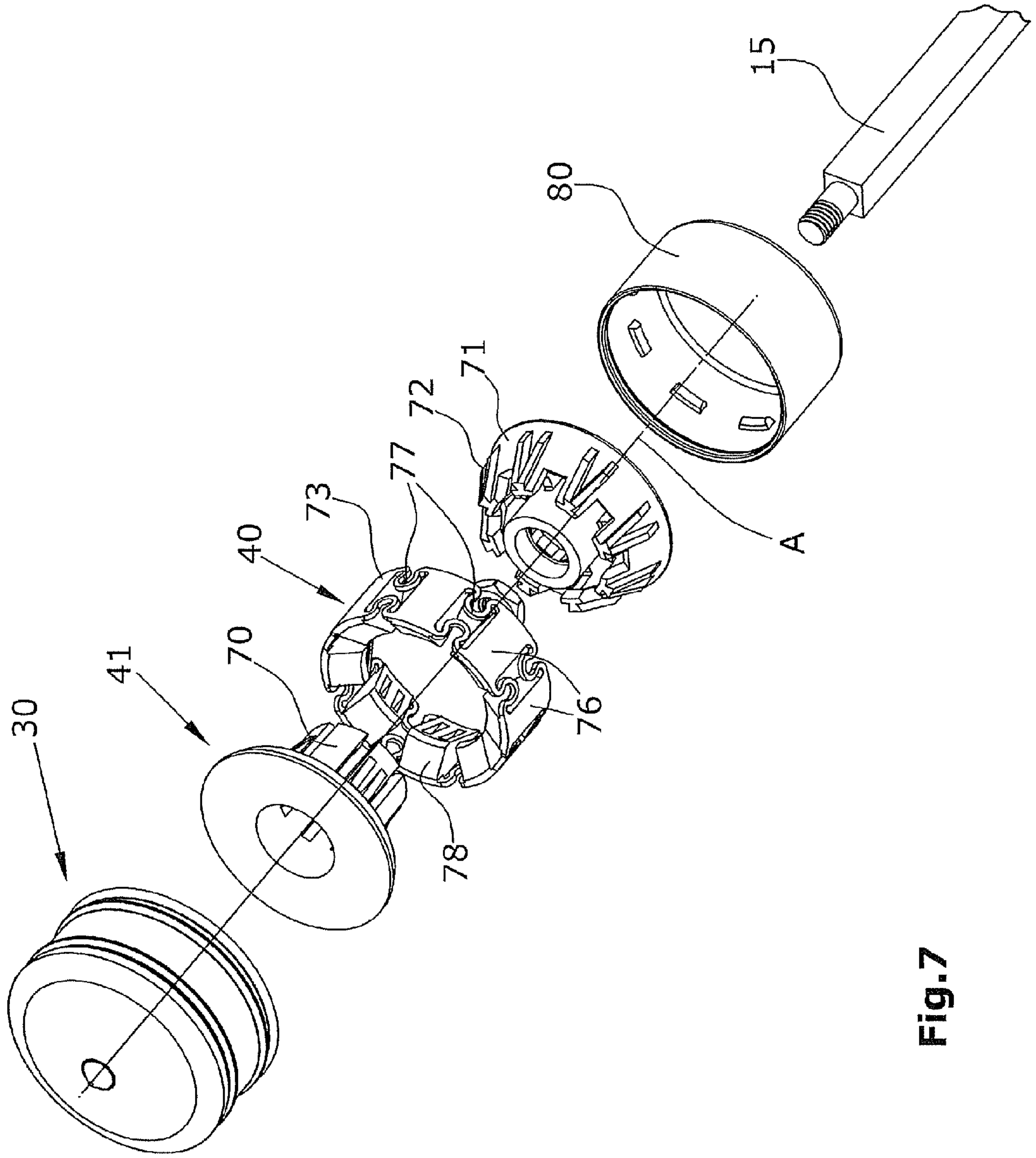
FIG. 7 is an exploded view of the pressure disk shown in FIG. 6.

The embodiment shown in FIGS. 6 and 7 comprises a piston 30 corresponding to that in the first embodiment. The pressure disk 16*a* comprises an annular support member 41.

Seated on a hollow shaft 70 of support member 41 is an annular pressure element 71 which is axially displaceable relative to support member 41 and is fastened to advancement rod 15 with the aid of a nut 43. Support member 41 comprises a conical sliding surface 52, and pressure element 71 also comprises a conical sliding surface 72. The sliding surfaces 52 and 72 are facing towards each other to form a receiving space accommodating the spreading member 40*a* which is formed as a spreading ring 73. Pressure disk 16*a* is provided with an expandable protective sleeve 75 surrounding the spreading member 40*a* and the pressure element 71.

Spreading ring 73 comprises a plurality of rigid segments 76 connected to each other by elastic elements 77. These elastic elements 77 can be integrally formed to said segments 76. Said elements 77 provide for radial expansibility of spreading ring 73. Spreading ring 73 comprises oblique surfaces 78,79 inclined in opposite directions and cooperating with said slide surfaces 52 and 72.

Upon application of an axial force on pressure element 71 by the advancement rod 15, pressure element 71 will move toward support member 41, thus radially expanding the spreading ring 73. The spreading ring presses against the inner wall of piston 30 via protective sleeve 75.

Spreading ring 73 does not necessarily have to consist of segments and elastic elements. It can also be an elastic O-ring adapted to be expanded by displacement of pressure element 71 relative to support member 41.

Figure 8:
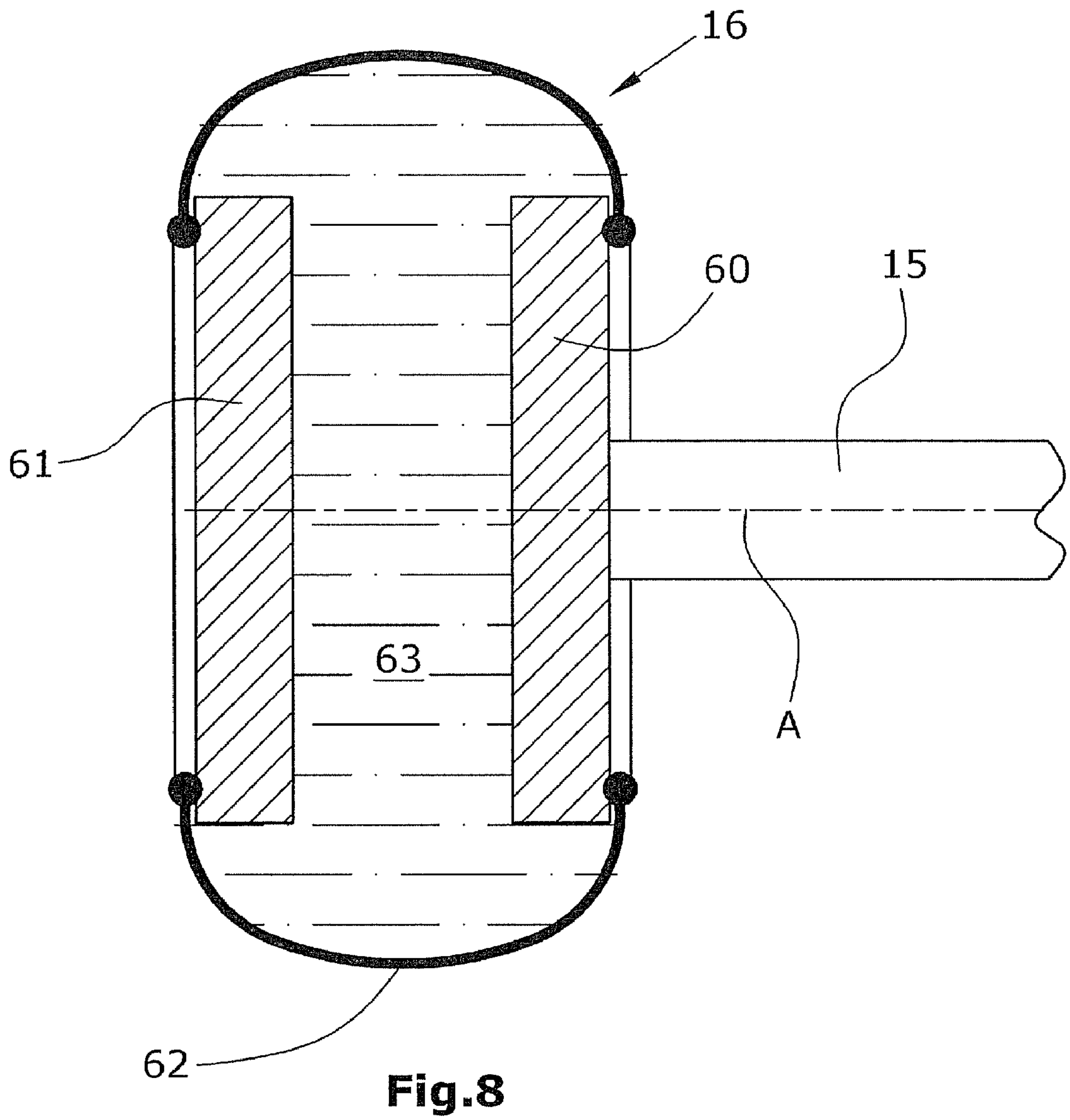
FIG. 8 is a view of a further embodiment of the pressure disk.

FIG. 8 schematically shows a further embodiment of pressure disk 16. Pressure disk 16 herein comprises two relatively rigid parallel plates which are connected to each other by a tubular flexible peripheral wall 62. Peripheral wall 62 together with plates 60,61 encloses a fluid chamber 63 filled with liquid. Under the influence of a press-on pressure exerted by advancement rod 15, said fluid is pressurized and will thus tend to laterally expand the peripheral wall 62. In this manner, peripheral wall 62 is pressed against side wall 31 of piston 30.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A caulking gun comprising a packing holder having a longitudinal axis and being configured to accommodate a substantially cylindrical packing, said packing including an axially displaceable packing bottom, and said caulking gun further comprising a pressure disk, wherein said pressure disk comprises a rigid support member and a deformable spreading member, the spreading member being attached to an advancement rod and positioned between the advancement rod and the support member, wherein the spreading member is configured to radially expand against the support member under the effect of an advancement force acting in the direction of said longitudinal axis thereby sealing an annular gap between the packing bottom and a side wall of the packing.

2. The caulking gun according to claim 1 wherein said packing bottom is a piston including a hollow space for accommodating the pressure disk.

3. The caulking gun according to claim 1 wherein said support member is axially displaceable relative to said spreading member.

4. The caulking gun according to claim 1 wherein said packing bottom is a piston including a hollow space for accommodating the pressure disk and the spreading member comprises a spreading edge engaging the rear end of the piston.

5. The caulking gun according to claim 1 wherein the spreading member comprises a spreading edge directly engaging the tubular packing holder.

6. The caulking gun according to claim 1 wherein the support member comprises a sliding surface directed obliquely outwards.

7. The caulking gun according to claim 1 wherein the spreading member comprises a hub having a plurality of elastic arms separated from each other by slits.

8. The caulking gun according to claim 1 wherein the spreading member is bell-shaped.

9. The caulking gun according to claim 1 wherein the support member and the spreading member are provided with mutually engaging locking elements.

* * * * *